United States Patent
Lentz et al.

(10) Patent No.: US 9,843,477 B2
(45) Date of Patent: *Dec. 12, 2017

(54) REPRESENTATION AND CONTROL OF THE SCOPE OF IMPACT IN INHERITED SETTINGS

(71) Applicant: International Business Machines Corporation, Armonk, NY (US)

(72) Inventors: James L Lentz, Austin, TX (US); Dana L Price, Cary, NC (US); Ramratan Vennam, Colfax, NC (US)

(73) Assignee: International Business Machines Corporation, Armonk, NY (US)

( * ) Notice: Subject to any disclaimer, the term of this patent is extended or adjusted under 35 U.S.C. 154(b) by 564 days.

This patent is subject to a terminal disclaimer.

(21) Appl. No.: 14/502,616

(22) Filed: Sep. 30, 2014

(65) Prior Publication Data

US 2015/0020183 A1    Jan. 15, 2015

Related U.S. Application Data

(63) Continuation of application No. 13/892,025, filed on May 10, 2013, now Pat. No. 9,577,880.

(51) Int. Cl.
*G06F 3/00* (2006.01)
*H04L 12/24* (2006.01)
(Continued)

(52) U.S. Cl.
CPC ........ *H04L 41/0813* (2013.01); *G06F 3/0482* (2013.01); *G06F 3/0484* (2013.01); *H04L 41/22* (2013.01); *H04L 63/083* (2013.01)

(58) Field of Classification Search
CPC ....... H04W 12/08; H04W 12/06; H04W 4/14; H04W 52/0212; H04W 52/0258;
(Continued)

(56) References Cited

U.S. PATENT DOCUMENTS 7,117,172 B1 * 10/2006 Black .................... G06Q 40/00
                                                            705/30
7,398,473 B2    7/2008 Stoner et al.
(Continued)

OTHER PUBLICATIONS

IBM, "WebSphere Business Modeler Publishing Server, Version 6.2—The Publishing Server Access Control Widget" Copyright IBM Corporation 2007, available at: http://publib.boulder.ibm.com/infocenter/dmndhelp/v6r2mx/index.jsp?topic=/com.ibm.btools.620.help.modeler.collab.publish.using.doc/pubserver/pub_server_access_control_widget.html last accessed Oct. 29, 2014, 3 pages.
(Continued)

*Primary Examiner* — Di Xiao
(74) *Attorney, Agent, or Firm* — Kunzler Law Group

(57) ABSTRACT

A method for representing and controlling an impact and scope of a widget value includes displaying at least one widget on a user interface. The widget includes a value. The value includes an inherited value. The method also includes displaying information of a scope of inheritance of the value before user interaction with the widget. The information of the scope of inheritance of the value includes a number of inheritance levels of the value and a number of objects impacted by a change to the value. The method also includes receiving a user input changing the value of the widget. The method also includes changing the value of the widget and the objects in response to receiving the user input.

7 Claims, 4 Drawing Sheets

(51) Int. Cl.
*G06F 3/0484* (2013.01)
*G06F 3/0482* (2013.01)
*H04L 29/06* (2006.01)

(58) Field of Classification Search
CPC ..... H04W 8/245; H04W 4/001; H04W 4/008; H04W 4/12
See application file for complete search history.

(56) References Cited

U.S. PATENT DOCUMENTS

| | | |
|---|---|---|
| 7,430,715 B2 | 9/2008 | Sullivan et al. |
| 7,996,773 B2 | 8/2011 | Hintermeister et al. |
| 2010/0305721 A1* | 12/2010 | Kostadinov ........ G05B 19/0426 700/87 |
| 2011/0060704 A1 | 3/2011 | Rubin et al. |
| 2011/0072416 A1 | 3/2011 | Hudson, Jr. et al. |
| 2011/0145138 A1* | 6/2011 | Bradley ................ G06Q 20/10 705/39 |
| 2013/0318500 A1* | 11/2013 | Eker ................... G06F 11/3664 717/125 |

OTHER PUBLICATIONS

Hutchy68, "J2.5:Access Control List Tutorial" Apr. 23, 2013, available at: https://web.archive.org/web/20130427054627/http://docs.joomla.org/index.php?title=J2.5:Access_Control_List_Tutorial &oldid=85139 last accessed Oct. 29, 2014, 25 pages.

Chau "Written Opinion of the International Searching Authority for International Application No. PCT/CA2014/050350" (dated Aug. 1, 2014), 4 pages.

\* cited by examiner

REPRESENTATION AND CONTROL OF THE SCOPE OF IMPACT IN INHERITED SETTINGS

CROSS-REFERENCE TO RELATED APPLICATIONS

This application is a continuation of U.S. application Ser. No. 13/892,025, filed on May 10, 2013, which is incorporated by reference herein in its entirety.

BACKGROUND

Systems and applications may inherit configuration settings from disparate systems, applications, or files. This allows an administrator to change a setting in one place while all systems, applications, and files that inherit the setting will change as well. Accurate and relevant information of the inheritance of a setting is not available before user interaction with the setting.

SUMMARY

Embodiments of a method for representing and controlling an impact and scope of a widget value are described. The method includes displaying at least one widget on a user interface. The widget includes a value. The value includes an inherited value. The method also includes displaying information of a scope of inheritance of the value before user interaction with the widget. The information of the scope of inheritance of the value includes a number of inheritance levels of the value and a number of objects impacted by a change to the value. The method also includes receiving a user input changing the value of the widget. The method also includes changing the value of the widget and the objects in response to receiving the user input.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
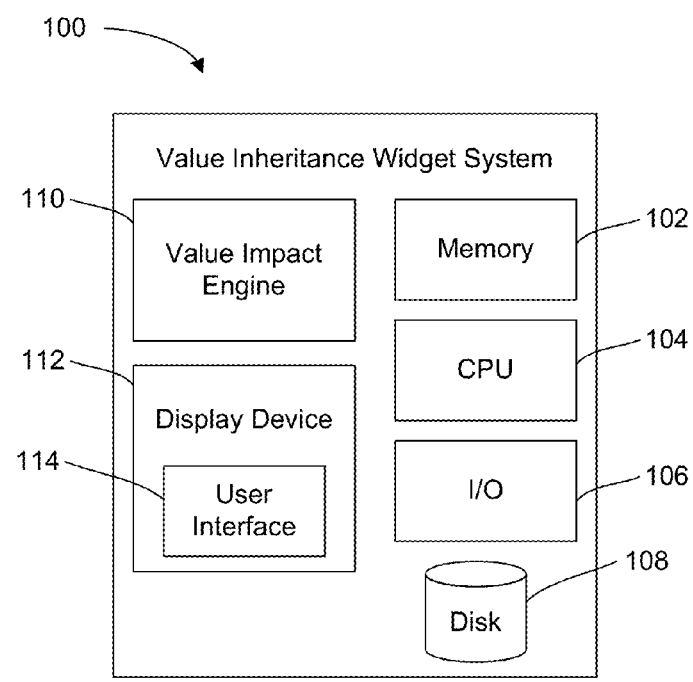
FIG. 1 depicts a schematic diagram of one embodiment of a value inheritance widget system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention.

Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate efficient administration of changes to inherited values within systems and applications. Some embodiments described herein involve displaying information of the scope of inheritance of a value before user interaction. Displaying information before user interaction allows administrators to quickly know the effect of changes before a change is attempted.

FIG. 1 depicts a schematic diagram of one embodiment of a value inheritance widget system 100. The depicted value inheritance widget system 100 includes various components, described below, that are capable of performing the functions and operations described herein. The illustrated value inheritance widget system 100 includes a computer memory device 102, a processing device 104, input/output devices 106, and a disk storage device 108. The illustrated value inheritance widget system 100 also includes a value impact engine 110 and a display device 112. Some or all of the components of the value inheritance widget system 100 may be stored on a single computing device or on a network of computing devices, including a wireless communication network. Although the value inheritance widget system 100 is shown and described with certain components and functionality, other embodiments of the value inheritance widget system 100 may include fewer or more components to implement less or more functionality.

The computer memory device 102 may store data and/or software instructions or computer program instructions for carrying out the operations described herein. The computer memory device 102 may be external or internal to the system and may include but is not limited to a hard drive, a CD/DVD recordable drive, a magnetic tape drive, a disk cartridge drive, a secure digital card, another type of magnetic or optical drive, a solid-state drive, or another type of memory device.

The processing device 104 is connected to and in communication with the memory device 102 and may store and access data on the memory device 102 for performing the operations described herein. The processor or processing device 104 may also be connected to the disk storage device 108. The disk storage device 108 may be implemented to temporarily store data or software instructions from the memory device 102 or the processor 104. The disk storage device 108 may include but is not limited to a hard disk drive, a floppy disk drive, a removable floppy disk, or other type of optical or magnetic drive, or another persistent storage device. The functionality of the value impact engine 110 may be implemented by computer program instructions stored on the computer memory device 102 and executed by the processing device 104 such as a CPU.

A user interface 114 is displayed on the display device 112. The display device 112 may be any display device 112 for a computing device. The user interface 114 may be part of an operating system for the computing device and may allow a user to interact with the operating system. The user interface 114 may rely on touch input, traditional mouse pointer input, or any other type of input system.

In some embodiments, the value impact engine 110 is configured to display at least one widget on the user interface 114. In some embodiments, the widget includes a value. In some embodiments, the value is an inherited value. A widget may be any graphical device indicating a configuration setting or value for a system, application, or file that can receive input and can inherit the configuration setting or value from another system, application, or file. In some embodiments, the value impact engine 110 is further configured to display information of a scope of inheritance of the value before user interaction with the widget. In some embodiments, the information of the scope of inheritance of the value is displayed on the user interface before a user selects the widget, changes the value of the widget, or any other user interaction with the widget.

In some embodiments, the information of the scope of inheritance of the value includes a number of inheritance levels of the value. The inheritance relationship of a value may be simple or complex. A value or configuration setting may be inherited through one or multiple levels, files, or applications. In some embodiments, the information of the scope of inheritance of the value includes a number of objects impacted by a change to the value. A change to the value may result in changes to a number objects within an inheritance chain. In some embodiments, the number of objects includes those objects that inherit the value from the widget. In some embodiments, the number of objects includes all objects within the inheritance chain including objects that inherit the value and objects from which the value is inherited.

In some embodiments, the value impact engine 110 is further configured to receive a user input changing the value of the widget. The user input may be a mouse click, a touch input, a keyboard input, or any other input communicated to a computer system through an input device. In some embodiments, the value impact engine 110 is further configured to change the value of the widget in response to receiving the user input. In some embodiments, the value impact engine 110 is further configured to change the value of the widget and the objects in response to receiving the user input. In some embodiments, all objects including objects that inherit the value and objects from which the value is inherited are changed. In some embodiments, all objects that inherit the value are changed.

In some embodiments, the value impact engine 110 is further configured to display information of a scope of inheritance of the changed value. In some embodiments, the information of the scope of inheritance of the changed value includes a number of inheritance levels of the changed value. In some embodiments, the information of the scope of inheritance of the changed value includes a number of objects impacted by a change to the changed value.

In some embodiments, the value impact engine 110 is further configured to display an authentication segment. A change made to a value that is inherited y multiple objects may have a large impact, and in some cases, it may be useful to require user authentication before changing a parent value. In some cases, the configuration file for the parent value may reside on a separate system that to which the user must authenticate. In some embodiments, the authentication segment includes a request for user identification. In some embodiments, the authentication segment includes a request for a password. In some embodiments, the value impact engine 110 is further configured to receive the user identification before the value of the widget and the objects are changed. In some embodiments, the value impact engine 110 is further configured to receive a password before the value of the widget and the objects are changed.

In some embodiments, the value impact engine 110 is further configured to display the information of the scope of inheritance of the value at every level of an inheritance chain of the value. In some embodiments, the value impact engine 110 is further configured to allow a user to change the value at every level of the inheritance chain.

In some embodiments, the value impact engine 110 is further configured to display a second widget comprising an overridden value. In some embodiments, the overridden value no longer inherits a value but still recognizes and indicates an inheritance chain. In some embodiments, the value impact engine 110 is further configured to display a visual indicator that the overridden value is overridden before user interaction with the widget.

In some embodiments, the value impact engine 110 is further configured to display a visual indicator that the widget previously comprised an inherited value.

In some embodiments, the value impact engine 110 is further configured to receive an input to restore the inherited value. In some embodiments, the value impact engine 110 is further configured to restore the inherited value in response to receiving the input.

In addition to the advantages which may be achieved by implementation of the individual components of the value inheritance widget system 100, some embodiments of the value inheritance widget system 100 provide additional advantages over conventional technology. For example, some embodiments of the value inheritance widget system 100 allow a user or administrator to quickly assess the inheritance chain of a value. Embodiments of the value inheritance widget system 100 allow a user or administrator know the scope of a change to a widget before interacting with the widget. Some embodiments of the value inheritance widget system 100 allow a user to efficiently edit configuration settings and controls without the frustration of pop-up boxes. Some embodiments of the value inheritance widget system 100 allow a single view of multiple values in a graphical user interface, while distinguishing the origin of the values and indicating the scope of impact of a change to a value before user interaction.

Figure 2:
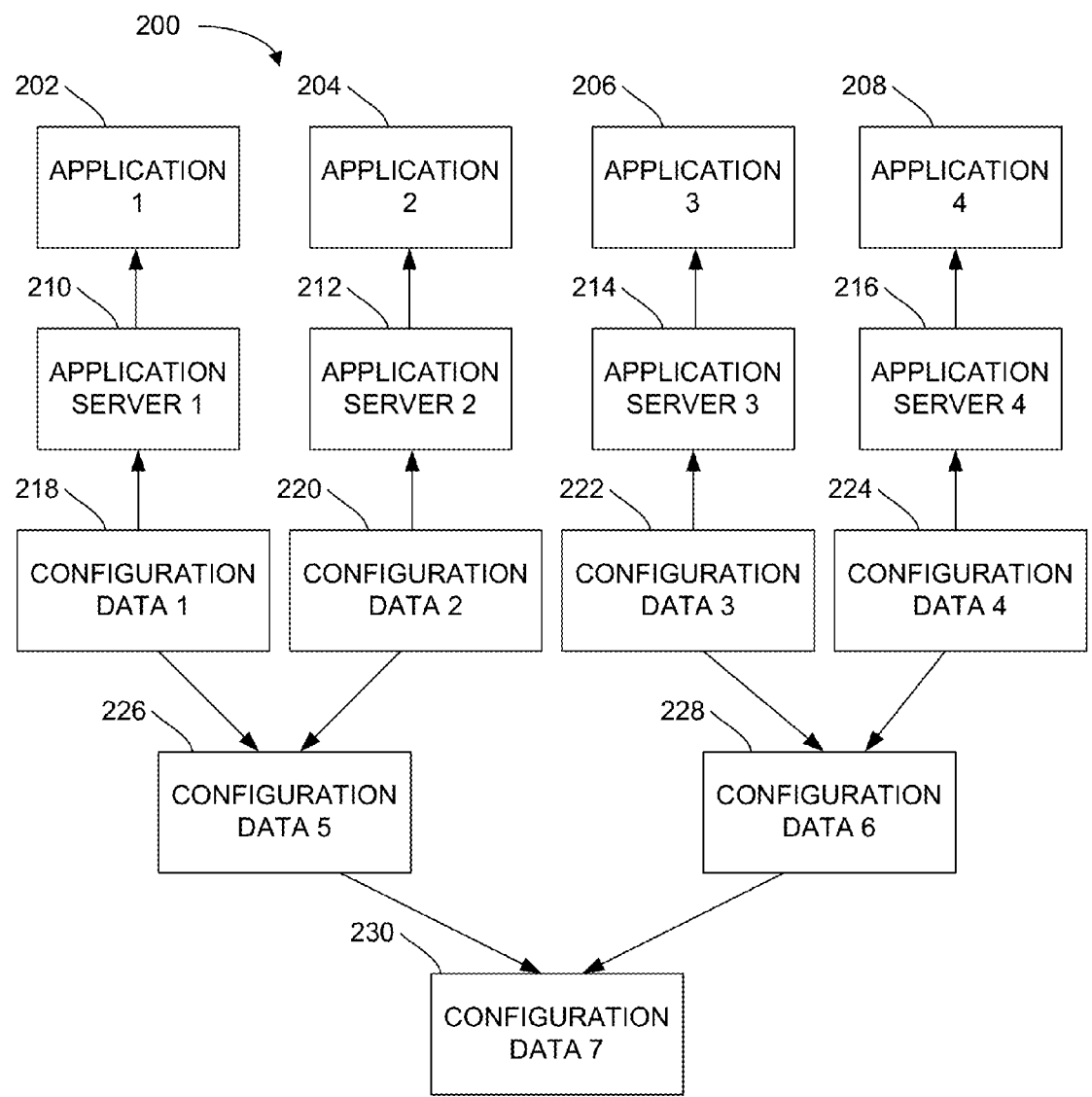
FIG. 2 depicts a schematic diagram of one embodiment of a computer server system that relies upon levels of inheritance to which the value inheritance widget system of FIG. 1 may be applied.

FIG. 2 depicts a schematic diagram of one embodiment of a computer server system 200 that relies upon levels of inheritance to which the value inheritance widget system 100 of FIG. 1 may be applied. In the depicted computer server system 200, application 1 202 resides on application server 1 210. Application 2 204 resides on application server 2 212. Application 3 206 resides on application server 3 214. Application 4 208 resides on application server 4 216.

The behavior and operation of applications servers 210-216 may be defined in files consisting of attribute-value pairs. The attribute-value pairs may specify the names of properties and their values and may be managed through a graphical user interface. Settings and values may be inherited from one configuration file to another. In the depicted computer server system 200, application server 1 210 uses the configuration settings of configuration file or configuration data 1 218. Application server 2 212 uses the configuration settings of configuration file or configuration data 2 220. Application server 3 214 uses the configuration settings of configuration file or configuration data 3 222. Application server 4 216 uses the configuration settings of configuration file or configuration data 4 224.

An administrator of the computer server system 200 may define common settings shared by multiple servers. Defining common settings in such a manner allows the administrator to effect a change in a single place and inherit the change in all settings within an inheritance chain. The values or settings in configuration file or configuration data 5 226 are included in both application server 1 210 and application server 2 212. The administrator may change a setting in either application server 1 210, or application server 2 212, or both. A change to a value or setting in configuration file 1 218 will not affect configuration file 2 220. Likewise, a change to a value or setting in configuration file 2 220 will not affect configuration file 1 218. A change to a value or setting in configuration file 5 226 will affect both configuration file 1 218 and configuration file 2 220.

Similarly, the values or settings in configuration file or configuration data 6 228 are included in both application server 3 214 and application server 4 216. An administrator may change a setting in either application server 3 214, or application server 4 216, or both. A change to a value or setting in configuration file 3 222 will not affect configuration file 4 224. A change to a value or setting in configuration file 4 224 will not affect configuration file 3 222. A change to a value or setting in configuration file 6 228 will affect both configuration file 3 222 and configuration file 4 224.

The values or settings in configuration file or configuration data 7 230 are included in all four application servers 1-4 210-216. A change to a value or setting in configuration file 7 230 will affect both configuration file 5 226 and configuration file 6 228. An administrator may make changes at the application level or a higher environment level. For example, the settings in configuration files 1 218 and 2 220 may define settings for server behavior in a test environment and configuration files 3 222 and 4 224 may define settings for a production environment. The settings of configuration file 7 230 are global and are inherited by both the test environment and the production environment.

The inheritance scheme of computer server system 200, as depicted in FIG. 2, may be applied to more complex schemes and to any number of levels. While the depiction outlined in FIG. 2 refers to server configuration settings, the value inheritance widget system 100 may be applied to any system or application that relies upon levels of inheritance.

Figure 3:
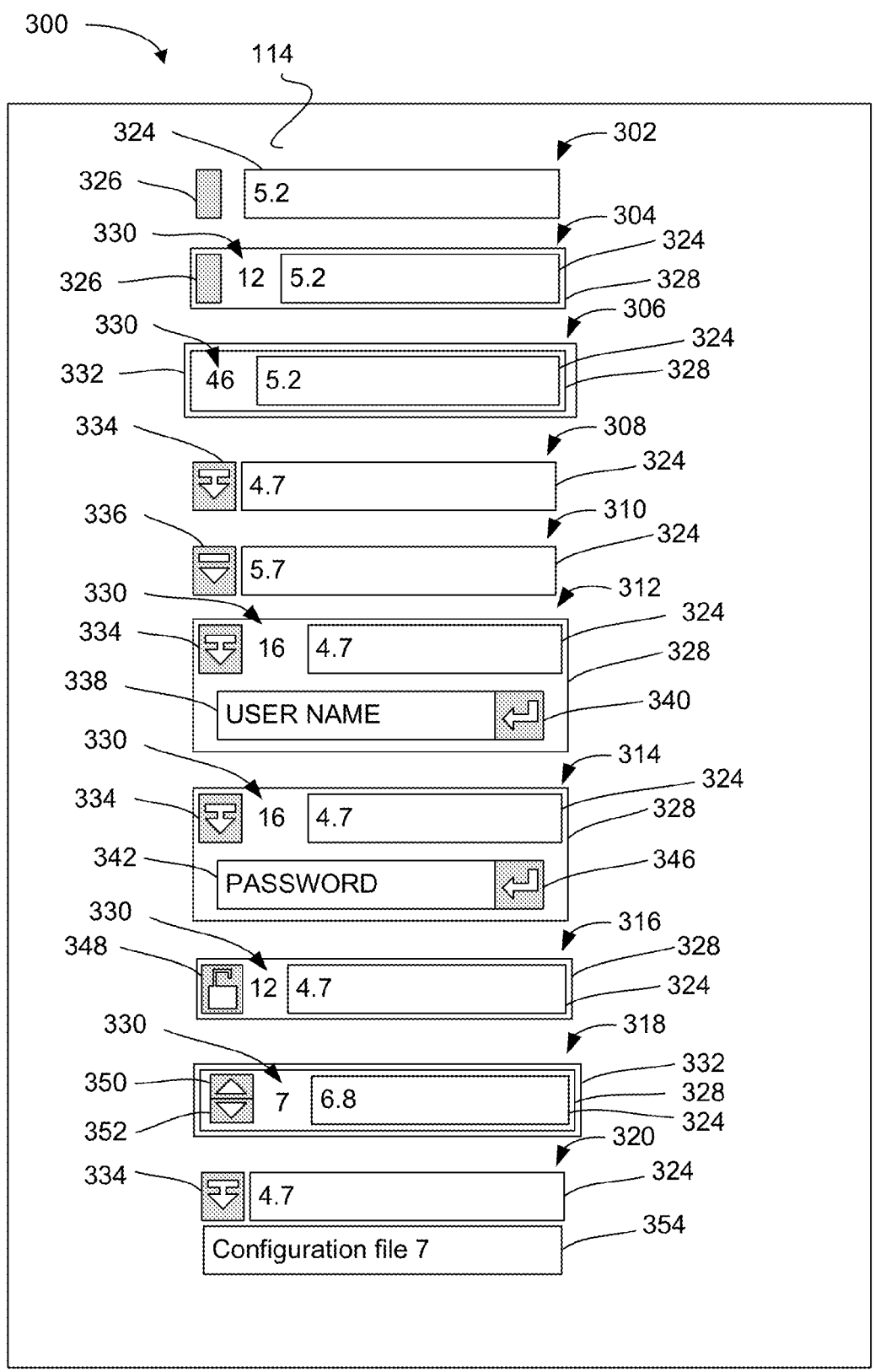
FIG. 3 depicts one embodiment of a user interface displaying some widgets and widget states as well as information of a scope of inheritance.

FIG. 3 depicts one embodiment of a user interface 114 of a computing device showing some widgets and widget states 302-320 and information of a scope of inheritance. The widgets 302-320 include various embodiments of information of a scope of inheritance.

Widget 302 includes a value, "5.2", in a text input box 324. For example, the value 5.2 may be a configuration setting for a server property. While the depicted embodiment shows a text input box 324, other embodiments may use checkboxes, radio buttons, dropdown lists, sliders, and other controls. Widget 302 also includes an inheritance icon 326 which indicates that the value 5.2 is inherited. The inheritance icon 326 also provides a mechanism for modifying the parent value from which the value 5.2 is inherited. While the depicted embodiment shows the inheritance icon 326, the visual representation that the value 5.2 is inherited may take other forms. By selecting the text input box 324, a user may edit or change the value 5.2 and by doing so will override the inheritance relationship of the value. By selecting the inheritance icon 326, a user may access the parent value, which is depicted by widget 304.

Widget 304 includes a value, "5.2", in a text input box 324. Other embodiments may user checkboxes, radio buttons, dropdown lists, sliders, and other controls. Widget 304 also includes an inheritance icon 326 indicating that the value 5.2 is inherited further. Widget 304 also includes an inheritance indicator 328 that indicates an inheritance level inherits the value 5.2. The inheritance indicator 328 is depicted as a box, but may be a recessed box or any other visual indication of inheritance. In this embodiment, the one level inherits the value 5.2. The widget 304 also includes a visual indication 330 of a number of objects (12) that inherit the value 5.2, which is the number of objects that are affected by a change to the value. By selecting the text input box 324, a user may edit or change the value 5.2 and by doing so will override the inheritance relationship and will change 12 objects that inherit the value 5.2. By selecting the inheritance icon 326, a user may access the parent value, which is depicted by widget 306.

Widget 306 includes a value, "5.2", in a text input box 324. The value 5.2 is not inherited from another level as the Widget 306 does not include an inheritance icon 326. The widget 306 includes inheritance indicators 328 and 332 that indicate that two levels inherit the value 5.2. The widget 304 also includes a visual indication 330 of a number of objects (46) that inherit the value 5.2, which is the number of objects that are affected by a change to the value. by selecting the text input box 324, a user may edit or change the value 5.2 and by doing so will change the 46 objects that inherit the value 5.2.

Widget 308 includes a value, "4.7", in a text input box 324. Widget 308 also includes an inheritance icon 334 indicating that the value 4.7 is inherited. By selecting the text input box 324, a user may edit or change the value 4.7 and by doing so will override the inheritance relationship with the level from which the value is inherited. Widget 310 shows the text input box 324 after the user has changed the value from 4.7 to 5.7. Widget 310 also includes a visual indication 336 that the value 5.7 is an override value and has overridden the inherited value 4.7. By selecting the visual indication 336, the value will restore the severed inheritance relationship and revert back to inheriting the value 4.7.

Widgets 312 and 314 require authentication before changing a value. Widget 312 includes a value, "4.7", in a text input box 324. Widget 312 also includes an inheritance icon 334 indicating that the value 4.7 is inherited. Widget 312 also includes an inheritance indicator 328 that indicates an inheritance level inherits the value 4.7. The widget 312 also includes a visual indication 330 of a number of objects (16) that inherit the value 4.7, which is the number of objects that are affected by a change to the value. Widget 312 also includes an authentication segment 338 and an enter button 340 that requests that a user name be entered before changing the value 4.7. Widget 314 includes many of the features and information that widget 312 includes. Widget 314 includes and authentication segment 342 and an enter button 346 that requests a password be entered before changing the value 4.7. In some embodiments, user identification and a password are required before changing the value. Widget 316 depicts a widget after authentication showing an icon 348 indicating that the value may be changed.

Widget 318 depicts another embodiment and includes a value 6.8 in a text input box 324. Widget 318 also includes inheritance indicators 328 and 332 that indicate that two levels inherit the value 6.8. Widget 318 also includes a visual indication 330 of a number of objects (7) that inherit the value 6.8, which is the number of objects that are affected by a change to the value. Widget 318 also includes icons 350 and 352 that allow a user to navigate through inheritance levels in either direction.

Widget 320 includes a value 4.7 in a text input box 324 and an inheritance indicator 334 which indicates that the value 4.7 is inherited. Widget 320 also includes an indication of the origin, "configuration file 7", of the inherited value 354.

Figure 4:
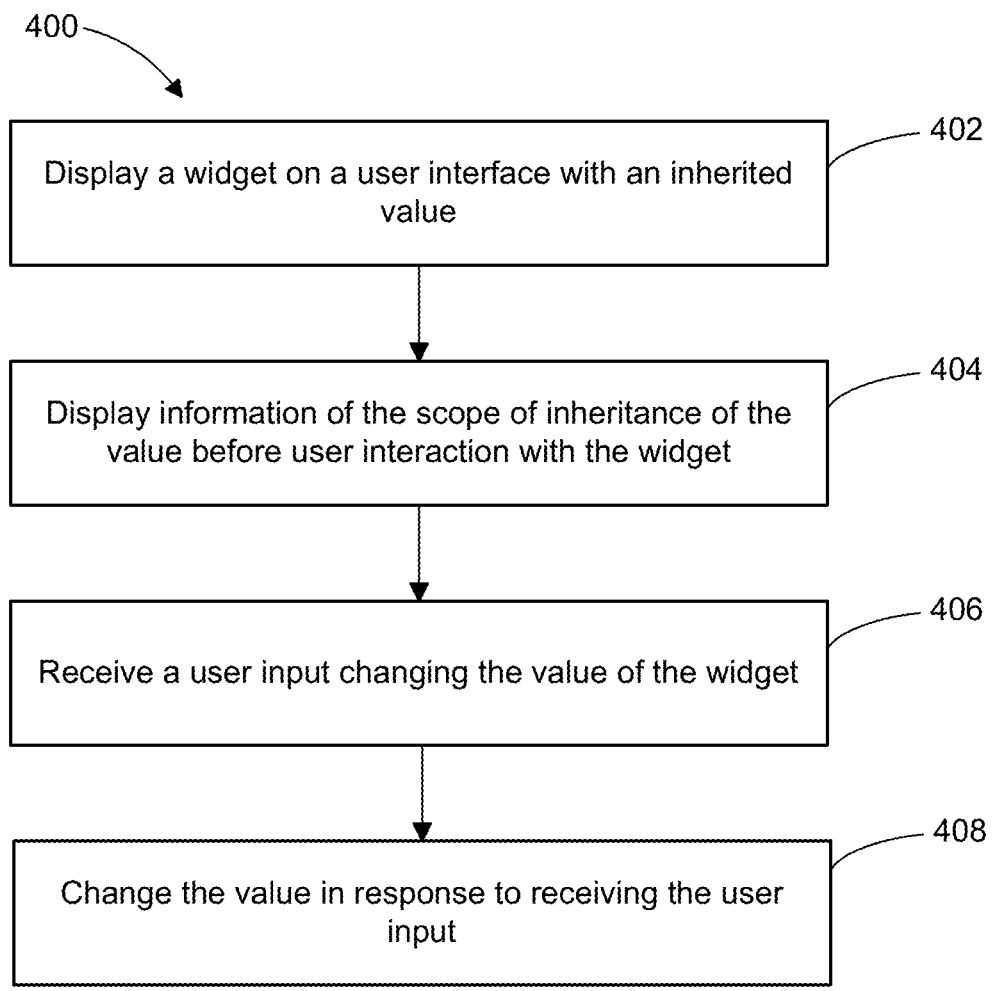
FIG. 4 depicts a flow chart diagram of one embodiment of a method for representing and controlling the impact and scope of a widget value.

FIG. 4 depicts a flow chart diagram of one embodiment of a method for representing and controlling an impact and scope of a widget value 400. Although the method for representing and controlling an impact and scope of a widget value 400 is described in conjunction with the value inheritance widget system of FIG. 1 and FIGS. 2-3, embodiments of the method 400 may be implemented with other types of computer systems.

At 402, at least one widget 304 is displayed on a user interface 114. In some embodiments, the widget includes a value. In some embodiments, the widget includes an inherited value. At 404, information of the scope of inheritance of the value is displayed on the user interface 114 before user interaction with the widget. In some embodiments, the scope of inheritance of the value includes a number of inheritance levels 328 of the value. In some embodiments, the scope of inheritance of the value includes a number of objects 330 impacted by a change to the value. In some embodiments, the scope of inheritance of the value includes an origin of the inherited value 354. At 406, a user input is receiving changing the value of the widget 304. At 408, the value is changed in response to receiving the user input. In some embodiments, the value of the widget and the objects are changed in response to receiving the user input. In some embodiments, the display of values is changed in response to the change of the value. The depicted method for representing and controlling an impact and scope of a widget value 400 then ends.

Some embodiments include displaying information of a scope of inheritance of the changed value. In some embodiments, the information of the scope of inheritance of the changed value includes a number of inheritance levels 328 of the changed value. In some embodiments, the information of the scope of inheritance of the changed value includes a number of objects 330 impacted by a change to the changed value. Some embodiments include displaying an authentication segment 342 within the widget 314. In some embodiments, the authentication segment 338 includes a request for user identification. In some embodiments, the authentication segment 342 includes a request for a password. Some embodiments include receiving the user identification and/or the password before changing the value of the widget 314.

Some embodiments include displaying the information of the scope of inheritance of the value at every level of an inheritance chain. Some embodiments allow a user to change the value at every level of the inheritance chain. Some embodiments include displaying an overridden value and a visual indication that the overridden value is overridden before user interaction with the widget 310. Some embodiments further include displaying a visual indication 336 that the overridden widget previously included an inherited value. Some embodiments include receiving an input to restore the inherited value and restoring the inherited value.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a value inheritance widget system includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (DD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for representing and controlling an impact and scope of a widget value, the method comprising:
    displaying at least one widget of a system on a user interface, wherein the widget comprises an inherited value, wherein the inherited value is inherited from a configuration setting of the system, wherein the inherited value is the same as the configuration setting;
    displaying information of a scope of inheritance of the inherited value before user interaction with the widget, wherein the information of the scope of inheritance of the inherited value comprises a number of inheritance levels of the inherited value and a numerical value of a number of objects impacted by a change to the inherited value, wherein values of the objects are the same as the inherited value;
    receiving a user input changing the inherited value of the widget; and
    changing the inherited value of the widget and the values of the objects in response to receiving the user input.

2. The method of claim 1, wherein the method further comprises displaying information of a scope of inheritance of the changed inherited value, wherein the information of the scope of inheritance of the changed inherited value comprises a number of inheritance levels of the changed inherited value and a numerical value of a number of objects impacted by a change to the changed inherited value.

3. The method of claim 1, wherein the method further comprises displaying an authentication segment comprising a request for user identification and a password and receiving the user identification and the password before the changing the inherited value of the widget.

4. The method of claim 1, wherein the method further comprises displaying the information of the scope of inheritance of the inherited value at every level of an inheritance chain of the inherited value and allowing a user to change the inherited value at every level of the inheritance chain.

5. The method of claim 1, wherein the method further comprises displaying a second widget comprising an override inherited value and a visual indicator that the override inherited value has overridden an inherited value before user interaction with the second widget.

6. The method of claim 5, wherein the method further comprises displaying a visual indicator that the second widget previously comprised the inherited value, and receiving an input to restore the inherited value, and restoring the inherited value.

7. The method of claim 1, wherein the information of the scope of inheritance of the inherited value further comprises an origin of the inherited value.

* * * * *